United States Patent
Kubo et al.

(10) Patent No.: US 11,268,003 B2
(45) Date of Patent: Mar. 8, 2022

(54) HEAT STORAGE DEVICE

(71) Applicant: Panasonic Corporation, Osaka (JP)

(72) Inventors: Takashi Kubo, Hyogo (JP); Motohiro Suzuki, Osaka (JP); Hironobu Machida, Nara (JP); Shinsuke Takeguchi, Osaka (JP); Kentaro Shii, Osaka (JP); Naoyuki Tani, Osaka (JP); Tatsuya Nakamura, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 321 days.

(21) Appl. No.: 16/667,946

(22) Filed: Oct. 30, 2019

(65) Prior Publication Data
US 2020/0063012 A1    Feb. 27, 2020

Related U.S. Application Data

(63) Continuation of application No. PCT/JP2018/011975, filed on Mar. 26, 2018.

(30) Foreign Application Priority Data

Jun. 29, 2017 (JP) .............................. JP2017-126876

(51) Int. Cl.
*F28D 20/02* (2006.01)
*C09K 5/06* (2006.01)

(52) U.S. Cl.
CPC ............ *C09K 5/063* (2013.01); *F28D 20/028* (2013.01)

(58) Field of Classification Search
CPC ...... F28D 20/02; F28D 20/021; F28D 20/023; F28D 20/028; F28D 2020/006; F28D 2020/0065; Y02E 60/14
See application file for complete search history.

(56) References Cited

U.S. PATENT DOCUMENTS 3,806,433 A * 4/1974 Diller ................. C25C 3/06
205/393
4,189,394 A * 2/1980 Schroder ............. C09K 5/063
252/70

(Continued)

FOREIGN PATENT DOCUMENTS

JP    61-204293    9/1986
JP    62-135392 U    8/1987

(Continued)

OTHER PUBLICATIONS

WO2016031275A1-English_machine_translation.pdf (Year: 2016).*
International Search Report of PCT application No. PCT/JP2018/011975 dated Jun. 19, 2018.

*Primary Examiner* — Jianying C Atkisson
*Assistant Examiner* — Jose O Class-Quinones
(74) *Attorney, Agent, or Firm* — McDermott Will & Emery LLP

(57) ABSTRACT

Provided is a heat storage device (10) of the present disclosure comprises a heat storage material (12) containing sodium acetate trihydrate; a first electrode having a surface which is in contact with the heat storage material and formed of at least one selected from the group consisting of silver, a silver alloy, and a silver compound; a second electrode in contact with the heat storage material; an inorganic porous material contained in the heat storage material; and a power supply (14) for applying a voltage to the first electrode and the second electrode. The inorganic porous material has an average pore diameter of not more than 50 nanometers. The present invention provides a heat storage device capable of releasing heat by releasing a supercooled state by voltage application. The heat storage device can be used repeatedly.

6 Claims, 2 Drawing Sheets

(56) References Cited

U.S. PATENT DOCUMENTS

| | | | | |
|---|---|---|---|---|
| 4,248,291 | A | * | 2/1981 | Jarmul .................... F28D 20/02 165/4 |
| 4,491,172 | A | * | 1/1985 | Hitchin ................. F28D 20/021 165/10 |
| 4,529,488 | A | * | 7/1985 | Kotani .................. F28D 20/028 205/44 |
| 4,645,612 | A | * | 2/1987 | della Faille d'Huysse ................ C09K 5/063 252/70 |
| 4,727,726 | A | * | 3/1988 | Mitani .................... F25B 13/00 62/238.6 |
| 4,850,424 | A | * | 7/1989 | Mitani ................. F28D 20/028 165/10 |
| 4,949,549 | A | * | 8/1990 | Steidl ...................... F25B 17/08 62/101 |
| 5,378,337 | A | * | 1/1995 | Kiyomura ............ F28D 20/028 204/230.3 |
| 5,954,119 | A | * | 9/1999 | Yamamura ............ F28D 20/028 165/10 |
| 6,007,504 | A | * | 12/1999 | Bailey .................... A61L 15/07 602/6 |
| 6,152,212 | A | * | 11/2000 | Saita ..................... F28D 20/028 165/10 |
| 9,758,710 | B2 | * | 9/2017 | Suzuki ................... C09K 5/063 |
| 2002/0031339 | A1 | * | 3/2002 | Hirano ................. F28D 20/028 392/344 |
| 2010/0162972 | A1 | * | 7/2010 | Hayashi ............. B60H 1/00492 123/41.14 |
| 2013/0074533 | A1 | * | 3/2013 | Yagi .................... B60H 1/00899 62/129 |
| 2015/0241136 | A1 | * | 8/2015 | Maeda ................ F28D 20/028 165/10 |
| 2015/0285566 | A1 | * | 10/2015 | Machida ............... F28D 20/028 165/10 |
| 2015/0345874 | A1 | * | 12/2015 | Honda .................. F28D 7/0016 165/10 |
| 2016/0090520 | A1 | * | 3/2016 | Suzuki ............... F28D 20/0034 165/10 |

FOREIGN PATENT DOCUMENTS

| | | |
|---|---|---|
| JP | 6-117787 | 4/1994 |
| JP | 2008-020177 | 1/2008 |
| JP | 2012-078030 | 4/2012 |
| JP | 2013-067720 | 4/2013 |
| JP | 2014-136974 | 7/2014 |
| JP | 2016-044917 | 4/2016 |
| JP | 2017-053528 | 3/2017 |
| WO | WO-2016031275 A1 * | 3/2016 ............ F28D 20/02 |

\* cited by examiner

HEAT STORAGE DEVICE

BACKGROUND

1. Technical Field

The present invention relates to a heat storage device.

2. Description of the Related Art

Patent Literature 1 discloses a heat storage system using sodium acetate trihydrate as a heat storage material.

Sodium acetate trihydrate melts at a melting point of 58 degrees Celsius. However, sodium acetate trihydrate does not solidify immediately even when cooled to not more than the melting point thereof. A state in which a liquid is not solidified even when cooled to not more than the melting point is referred to as a supercooled state.

After the heat storage material containing sodium acetate trihydrate is heated and melted, the heat storage material is cooled until the heat storage material is in the supercooled state. In this way, latent heat is stored in the sodium acetate trihydrate. When heat is required, the supercooled state of the heat storage material containing the sodium acetate trihydrate is released. The state of the sodium acetate trihydrate is changed from a liquid state to a solid state. Due to the change, heat is released from the sodium acetate trihydrate. In other words, the latent heat is taken out. In this way, the heat storage effect is achieved.

Patent Literature 2 discloses a heat storage tank comprising a silver electrode for applying a voltage to a heat storage material in a supercooled state as a means for releasing the supercooled state.

Patent Literature 3 discloses a supercooling preventing agent, a heat storage method, and a heat storage system. The production method according to Patent Literature 3 comprises steps of immersing a porous material in a melt containing sodium acetate trihydrate, and cooling the melt and the porous material at not more than a temperature at which the supercooling of the melt is released while maintaining the porous material immersed in the melt. Heat is stored by heating the heat storage material containing the sodium acetate trihydrate at a temperature higher than the melting point of sodium acetate trihydrate. In the presence of the supercooling preventing agent produced according to the method according to Patent Literature 3, heat is drawn from the heat storage material in such a way that the sodium acetate trihydrate changes from liquid phase to solid phase.

CITATION LIST

Patent Literature

Patent Literature 1: Japanese Patent Application Publication No. 2008-20177
Patent Literature 2: Japanese Patent Application Publication No. Sho 61-204293
Patent Literature 3: Japanese Patent Application Publication No. 2013-067720

SUMMARY

An object of the present invention is to provide a heat storage device capable of releasing heat by releasing supercooling by voltage application and capable of being used repeatedly.

The present invention is a heat storage device comprising:
a heat storage material containing sodium acetate trihydrate;
a first electrode having a surface which is in contact with the heat storage material; the surface being formed of at least one selected from the group consisting of silver, a silver alloy, and a silver compound, a second electrode in contact with the heat storage material;
an inorganic porous material contained in the heat storage material; and
a power supply for applying a voltage to the first electrode and the second electrode,
wherein
the inorganic porous material has an average pore diameter of not more than 50 nanometers.

The present invention includes a heat releasing method using the above-mentioned heat storage device.

The present invention includes a vehicle comprising the above-mentioned heat storage device. Furthermore, the present invention includes a method for applying heat to an engine in the vehicle.

The present invention provides a heat storage device capable of releasing heat by releasing supercooling by voltage application and capable of being used repeatedly.

DETAILED DESCRIPTION OF THE EMBODIMENT

Hereinafter, an embodiment of the present invention will be described with reference to the drawings.

(Heat Storage Device 10)

Figure 1:
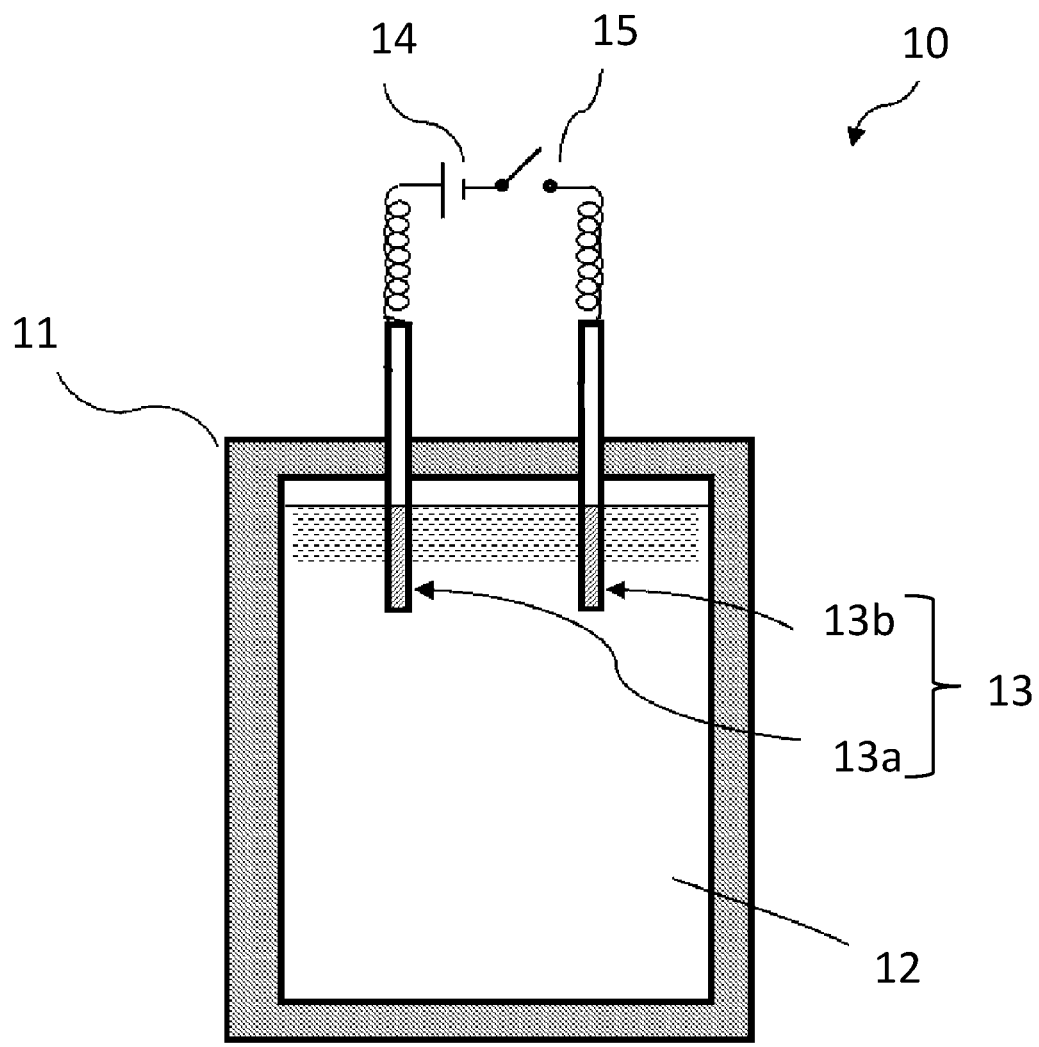
FIG. 1 shows a schematic view of a heat storage device according to an embodiment.

FIG. 1 shows a schematic view of a heat storage device 10 according to the embodiment. In FIG. 1, the heat storage device 10 comprises a heat storage tank 11 filled with a heat storage material 12, a pair of electrodes 13 comprising a first electrode 13a and a second electrode 13b, a direct-current power supply 14, and a switch 15.

(Heat Storage Tank 11)

The heat storage tank 11 is maintained warm by a heat insulating material. An example of the heat insulating material is glass wool. The heat storage tank 11 contains the heat storage material 12. In the present embodiment, the heat storage material 12 is sodium acetate trihydrate. In other words, the heat storage material 12 contains sodium acetate trihydrate as a main component.

(Heat Storage Material 12)

The heat storage material 12 contains an inorganic porous material.

As will be described in detail later, the present inventors believe that the inside of pores of the inorganic porous material has a fine solid-phase heat storage material 12. In the present specification, the fine solid-phase heat storage material 12 is also referred to as a "cluster". The fine solid-phase heat storage material 12 contained in the pores has stronger intermolecular bonding than the heat storage material 12 located outside the pores due to capillary condensation.

For this reason, when the heat storage material 12 is heated, the heat storage material 12 contained in the pores melts more slowly than the heat storage material 12 located outside the pores. As a result, it is possible to enhance viability of the cluster after the heat storage material 12 is held at a high temperature in the liquid state. Therefore, even after the heat storage material 12 is held at the high temperature in the liquid state, voltage application can cancel the supercooled state of sodium acetate trihydrate at a temperature of not more than 58 degrees Celsius. In more detail, even after the heat storage material 12 is held at the high temperature in the liquid state, since the cluster (i.e., the fine solid-phase heat storage material 12) is located in the pores, the voltage is applied to the heat storage material 12 in the supercooled state to crystalize the heat storage material 12 in such a way the crystalized heat storage material 12 is spread from the center of the cluster to the surroundings thereof. In other words, the crystallization of the heat storage material 12 at the time when the voltage is applied to the heat storage material 12 in the supercooled state starts from the cluster.

The inorganic porous material contained in the heat storage material 12 has an average pore diameter of not more than 50 nanometers. The pore diameter of the inorganic porous material can be measured by a commonly used method. For example, the pore diameter can be calculated based on a nitrogen gas adsorption method or a mercury intrusion method. The term "average pore diameter" used in the present specification means a pore diameter at a peak value of a pore diameter distribution curve derived from an adsorption isotherm of nitrogen by a Barret-Joyner-Halenda method (hereinafter, referred to as "BJH method") or a Horvath-Kawazoe method (hereinafter, referred to as "HK method"). The pore diameter distribution curve is drawn on a graph in which the horizontal axis and the vertical axis thereof represent the pore diameter and the volume of pores respectively. The average pore diameter is equal to the pore diameter at the maximum of the pore volume. Alternatively, the term "average pore diameter" used in the present specification means the pore diameter at the peak value of the pore diameter distribution curve provided by the mercury intrusion method. In the present specification, the average pore diameter of zeolite, mesoporous silica, or activated carbon is calculated by the nitrogen gas adsorption method. The average pore diameter of silica gel is calculated by the mercury intrusion method. The average pore diameter of the commercially available inorganic porous material is often disclosed in its catalog.

As demonstrated in the comparative example 2 which will be described later, in case where the average pore diameter is more than 50 nanometers, the supercooled state of the sodium acetate trihydrate fails to be released, even when a voltage is applied after the heat storage material 12 is held at a high temperature in a liquid state. The present inventors believe that this is because, in the case where the average pore diameter is more than 50 nanometers, the viability of the clusters after the heat storage material 12 is held at the high temperature in the liquid state is significantly lowered due to decrease in the effect of the capillary condensation. Needless to say, even in the case where the heat storage material 12 does not contain the inorganic porous material, the supercooled state of sodium acetate trihydrate fails to be released for the same reason as described above.

On the other hand, the lower limit of the average pore diameter of the inorganic porous material is not limited, as long as the inside of the pores has the heat storage material 12 and the melting of the cluster is suppressed. As one example, the average pore diameter of the inorganic porous material is not less than 0.9 nanometers.

The material of the inorganic porous material is, for example, a metal oxide or carbon. An example of the metal oxide is zeolite, silica, alumina, titania, or a tungsten oxide.

As demonstrated in the inventive examples which will be described below, the desirable inorganic porous material is activated carbon or silica gel.

Activated carbon and silica gel have, on their surfaces, pores each having a size of not more than 50 nanometers (hereinafter, referred to as "micro mesopores") and pores each having a size of more than 50 nanometers (hereinafter, referred to as "macropores"). The micro mesopores communicate with the macropores.

Figure 2:
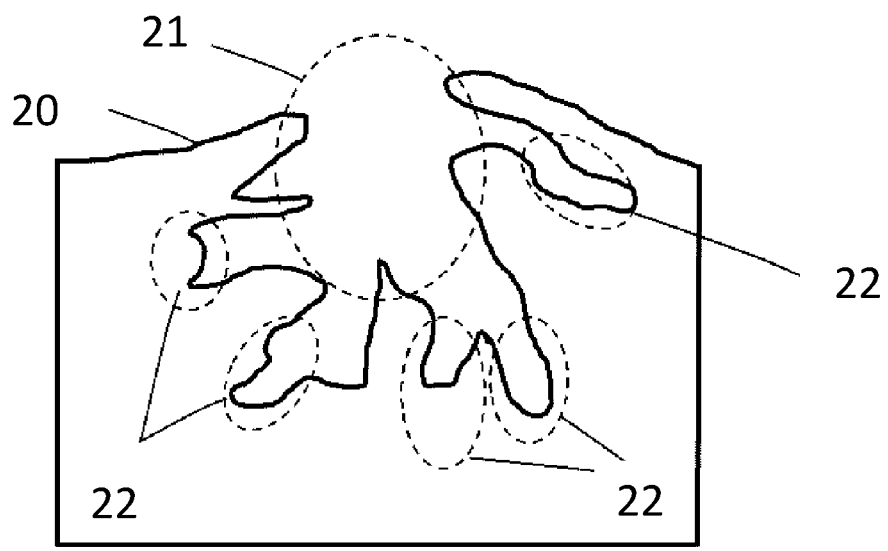
FIG. 2 shows a schematic view of a pore structure of an activated carbon.

FIG. 2 shows a schematic view of the pore structure of the inorganic porous material. As shown in FIG. 2, a surface 20 of the activated carbon has a macropore 21. The micro mesopores 22 are disposed inside the activated carbon so as to communicate with the macropore 21. Therefore, the heat storage material 12 is easily introduced into the micro mesopores 22. In this way, the fine solid-phase heat storage material 12 is formed in the micro mesopores. This will be described in detail later.

As a result, the heat storage material 12 in larger amount can be disposed in the micro mesopores 22 each having a size of not more than 50 nanometers, as compared to an inorganic porous material having no macropore 21 such as mesoporous silica. As a result, the viability of the cluster is further improved after the heat storage material 12 is held at the high temperature in the liquid state. For this reason, even if the heat storage material 12 is held at the high temperature for a long time in the liquid state, the supercooling can be released by voltage application.

The heat storage material 12 may contain an additive. An example of the additives is a supercooling release aid, a viscosity modifier, a foam stabilizer, an antioxidant, a defoamer, an abrasive grain, a filler, a pigment, a dye, a colorant, a thickener, a surfactant, a flame retardant, a plasticizers, a lubricant, an antistatic agent, a heat stabilizer, a tackifier, a curing catalyst, a stabilizer, a silane coupling agent, or a wax. The type and amount of the additives are not limited, as long as the object of the present invention is not hindered. The additives do not have to be added to the heat storage material 12.

(Method for Forming Fine Solid-Phase Heat Storage Material 12 in Pores of Inorganic Porous Material)

The method for forming the fine solid-phase heat storage material 12 in the pores of the inorganic porous material will be described below. The heat storage material 12 containing the inorganic porous material is heated at a temperature equal to or higher than the melting point of the heat storage material 12 (i.e., 58 degrees Celsius). Thus, the heat storage material 12 is in a liquid state. Next, the heat storage material 12 is allowed to leave at rest for a predetermined time, while the temperature is maintained. During this time, the heat storage material 12 is introduced into the pores of the inorganic porous material. The present inventors believe that the heat storage material 12 is introduced into the pores of the inorganic porous material by capillary action.

Thereafter, the heat storage material 12 is cooled at a temperature of minus 30 degrees Celsius or lower. Alternatively, the heat storage material 12 is supercooled by being cooled to not more than 58 degrees Celsius, and then, a seed crystal formed of sodium acetate trihydrate is added to the heat storage material 12. The heat storage material 12 in the pores is crystallized by cooling at a low temperature of not more than minus 30 degrees Celsius or by the addition of the seed crystal in the supercooled state. In other words, the heat storage material 12 in the pore changes from the liquid phase to the solid phase. In this way, the fine solid-phase heat storage material 12 can be formed in the pores of the inorganic porous material.

(Electrode, Power Supply, and Switch)

As shown in FIG. 1, the first electrode 13a and the second electrode 13b are electrically connected to the power supply 14 through an electric wiring and the switch 15.

The first electrode 13a and the second electrode 13b are both disposed to be in contact with the heat storage material 12. The distance between parts of the first electrode 13a and the second electrode 13b which are in contact with the heat storage material 12 is not particularly limited. An example of the distance is not less than 1 millimeter and not more than 30 millimeters.

The first electrode 13a has silver, a silver alloy, or a silver compound on the surface thereof. Needless to say, the silver or the silver alloy is in contact with the heat storage material 12. An example of the silver alloy is a silver palladium alloy or a silver copper alloy. An example of the silver compound is a silver halide or a silver oxide. An example of the silver halide is silver bromide.

The second electrode 13b does not have to have silver, a silver alloy, or a silver compound on the surface thereof. Needless to say, the second electrode 13b may also have silver, a silver alloy or a silver compound on the surface thereof.

The shapes of the first electrode 13a and the second electrode 13b are not limited. The shapes of the first electrode 13a and the second electrode 13b are, for example, plate-shaped or linear.

In place of the direct-current power supply 14, an alternate-current power supply may be used.

The heat storage device 10 according to the present embodiment may comprise a plurality of heat storage tanks 11. Each of the heat storage tanks 11 may comprise the first electrode 13a and the second electrode 13b, both of which are in contact with the heat storage material 12. The plurality of the heat storage tanks 11 may be electrically connected in parallel to the direct-current power supply 14.

(How to Use Heat Storage Device 10)

First, the heat storage material 12 is cooled and brought into the supercooled state. In this way, the latent heat is stored in the sodium acetate trihydrate.

Next, a voltage is applied between the first electrode 13a and the second electrode 13b to release the supercooled state of the heat storage material 12. The release of the supercooled state of the heat storage material 12 by voltage application crystallizes the heat storage material 12. As a result, the heat storage material 12 releases the heat. In other words, the latent heat is taken out.

(Reuse of Heat Storage Device 10)

After the heat storage material 12 releases the heat, the heat storage device is heated at a temperature of not less than 58 degrees Celsius and not more than 80 degrees Celsius for repeated use. In this way, the sodium acetate trihydrate contained in the heat storage material 12 is melted. In other words, the crystallized sodium acetate trihydrate (i.e., the sodium acetate trihydrate in the solid state) is melted due to the heating. The heat storage material 12 must not be heated at a temperature of not less than 90 degrees Celsius. In case where the heat storage material 12 is heated at a temperature of not less than 90 degrees Celsius, as demonstrated in the comparative examples 4-12, the viability of the cluster is significantly lowered.

However, even if the heat storage material 12 is heated at a temperature of not less than 90 degrees Celsius, the fine solid-phase heat storage material 12 may be formed again in the pores of the inorganic porous material by the cooling at the low temperature of not more than minus 30 degrees Celsius or by the addition of the seed crystal in the supercooled state.

EXAMPLES

The present invention will be described in more detail with reference to the following examples.

Inventive Example 1

The inventive example 1 is composed of the inventive examples 1A-1D.

Inventive Example 1A (Preparation of Heat Storage Device 10)

Sodium acetate (2.2 grams), water (1.8 grams), and a zeolite having an average pore diameter of 0.9 nanometers were added to the heat storage tank 11. The heat storage tank 11 was a glass sample bottle having a capacity of 9 milliliters. The zeolite was purchased from Tosoh Corporation under the trade name "X-type zeolite, F-9". The addition amount of the zeolite was 20% by mass with regard to the total weight of the sodium acetate and the water (i.e., 4.0 grams). In other words, the addition amount of the zeolite was 0.8 grams. Thus, the heat storage material 12 containing the zeolite and containing the sodium acetate trihydrate as the main component was stored in the heat storage tank 11.

Next, the first electrode 13a and the second electrode 13b each composed of an electric wire formed of silver were immersed in the heat storage material 12. Each of the first electrode 13a and the second electrode 13b had a diameter of 1.5 millimeters. The length of the portion where the first electrode 13a and the second electrode 13b were in contact with the heat storage material 12 was approximately 5 millimeters. The heat storage tank 11 was covered with a lid. In this way, the heat storage device 10 according to the inventive example 1 was provided.

(Evaluation of Heat Storage Device 10)

The liquid heat storage material 12 contained in the heat storage tank 11 was allowed to leave at rest at a temperature of 70 degrees Celsius for two hours. The present inventors believe that the heat storage material 12 entered the pores of the zeolite in this period. Subsequently, the heat storage material 12 was cooled to minus 30 degrees Celsius. In this way, the heat storage material 12 was crystallized. The present inventors believed that both the heat storage material 12 in the pores and the heat storage material 12 outside the pores were changed from the liquid state to the solid state.

Next, the heat storage material 12 contained in the heat storage tank 11 was heated at a temperature of 70 degrees Celsius for one hour. Due to the heating, the heat storage material 12 was melted. Next, the heat storage material 12 was allowed to leave at rest at a stationary temperature of 80 degrees Celsius for a stationary time of 15 minutes. Furthermore, the heat storage material 12 was cooled to room temperature (approximately 25 degrees Celsius). A voltage of two volts was applied for approximately two minutes between the first electrode 13a and the second electrode 13b, and then, the present inventors visually observed whether or not the heat storage material 12 was crystallized. The evaluation was repeated six times. Table 1 shows the observation results. The numerators of the fractions included in Table 1 are the number of times that the heat storage material

12 is crystallized. The denominators of the fractions included in Table 1 are the number of times of the evaluation (i.e., six times).

Inventive Examples 1B-1 D

In the inventive examples 1B-1D, the experiment similarly to the inventive example 1A was conducted except that the stationary time was 30 minutes, one hour, and two hours, respectively. The experimental results are shown in Table 1.

Inventive Example 2

The experiment similarly to the inventive example 1 was conducted except for the following matters (i) and (ii).

(i) In place of the zeolite, mesoporous silica (purchased from Sigma-Aldrich under the trade name "MCM-41", average pore diameter: 2.5-3.0 nanometers) was used, and (ii) The addition amount of the mesoporous silica was 15% by mass (i.e., 0.6 grams) with regard to the total weight of the sodium acetate and the water (i.e., 4.0 grams).

Inventive Example 3

The experiment similarly to the inventive example 1 was conducted except for the following matter (i).

(i) In place of the zeolite, activated carbon (purchased from Calgon Carbon Japan Co., Ltd. under the trade name "activated carbon made from coconut shell", average pore diameter: 1.0 nanometer-3.0 nanometers) was used.

Inventive Example 4

The experiment similarly to the inventive example 1 was conducted except for the following matter (i).

(i) In place of the zeolite, silica gel (purchased from Fuji Silysia Chemical Co., Ltd. under the trade name "MB100", average pore diameter: 10 nanometers) was used.

Inventive Example 5

The experiment similarly to the inventive example 1 was conducted except for the following matter (i).

(i) In place of the zeolite, silica gel (purchased from Fuji Silysia Chemical Co., Ltd. under the trade name "MB300", average pore diameter: 30 nanometers) was used.

Inventive Example 6

The experiment similarly to the inventive example 1 was conducted except for the following matter (i).

(i) In place of the zeolite, silica gel (purchased from Fuji Silysia Chemical Co., Ltd. under the trade name "MB500", average pore diameter: 50 nanometers) was used.

Comparative Example 1

The experiment similarly to the inventive example 1 was conducted except that the zeolite was not added to the heat storage tank 11.

Comparative Example 2

The experiment similarly to the inventive example 1 was conducted except for the following matter (i).

(i) In place of the zeolite, silica gel (purchased from Fuji Silysia Chemical Co., Ltd. under the trade name "MB800", average pore diameter: 80 nanometers) was used.

Comparative Example 3

The experiment similarly to the inventive example 1 was conducted except for the following matter (i).

(i) In place of the zeolite, silica (purchased from Kanto Chemical Co., Ltd.) was used. The silica was formed of amorphous silicon dioxide having no pores.

(Comparative examples 4-12)

The experiments similarly to the inventive examples 1-6 and the comparative examples 1-3 were conducted except that the stationary temperature was 90 degrees Celsius. The results are shown in Table 2.

TABLE 1

Stationary temperature: 80 degrees Celsius
Numerators: times that the heat storage material 12 was crystallized.
Denominators: evaluation times (i.e., six times)

| | Inorganic Porous Material | Average Pore Diameter (nanometers) | Stationary Time | | | |
|---|---|---|---|---|---|---|
| | | | 15 minutes | 30 minutes | One hour | Two hours |
| Inventive Example 1 | Zeolite | 0.9 | 6/6 | 6/6 | 6/6 | 4/6 |
| Inventive Example 2 | Mesoporous silica | 2.5-3.0 | 6/6 | 6/6 | 6/6 | 4/6 |
| Inventive Example 3 | Activated carbon | 1.0-3.0 | 6/6 | 6/6 | 6/6 | 6/6 |
| Inventive Example 4 | Silica gel | 10 | 6/6 | 6/6 | 6/6 | 6/6 |
| Inventive Example 5 | Silica gel | 30 | 6/6 | 6/6 | 6/6 | 6/6 |
| Inventive Example 6 | Silica gel | 50 | 6/6 | 6/6 | 6/6 | 6/6 |
| Comparative Example 1 | None | — | 6/6 | 3/6 | 3/6 | 2/6 |
| Comparative Example 2 | Silica gel | 80 | 6/6 | 3/6 | 3/6 | 2/6 |
| Comparative Example 3 | Silica | — | 6/6 | 3/6 | 2/6 | 2/6 |

TABLE 2

Stationary temperature: 90 degrees Celsius
Numerators: times that the heat storage material 12 was crystallized.
Denominators: evaluation times (i.e., six times)

| | Inorganic Porous Material | Average Pore Diameter (nanometers) | stationary time | | | |
|---|---|---|---|---|---|---|
| | | | 15 minutes | 30 minutes | One hour | Two hours |
| Comparative Example 4 | Zeolite | 0.9 | 3/6 | 2/6 | 1/6 | 0/6 |
| Comparative Example 5 | Mesoporous silica | 2.5-3.0 | 4/6 | 2/6 | 1/6 | 5/6 |
| Comparative Example 6 | Activated carbon | 1.0-3.0 | 4/6 | 4/6 | 3/6 | 2/6 |
| Comparative Example 7 | Silica gel | 10 | 4/6 | 4/6 | 3/6 | 2/6 |

TABLE 2-continued

Stationary temperature: 90 degrees Celsius
Numerators: times that the heat storage material 12 was crystallized.
Denominators: evaluation times (i.e., six times)

| | Inorganic Porous Material | Average Pore Diameter (nanometers) | stationary time | | | |
|---|---|---|---|---|---|---|
| | | | 15 minutes | 30 minutes | One hour | Two hours |
| Comparative Example 8 | Silica gel | 30 | 5/6 | 4/6 | 4/6 | 2/6 |
| Comparative Example 9 | Silica gel | 50 | 4/6 | 3/6 | 3/6 | 2/6 |
| Comparative Example 10 | None | — | 2/6 | 0/6 | 0/6 | 0/6 |
| Comparative Example 11 | Silica gel | 80 | 2/6 | 0/6 | 0/6 | 0/6 |
| Comparative Example 12 | Silica | — | 2/6 | 0/6 | 0/6 | 0/6 |

As is clear from Table 1 and Table 2, the stationary temperature needs to be not more than 80 degrees Celsius. Otherwise, the crystallization of the heat storage material 12 often fails. As is clear from Table 1, the average pore diameter needs to be not more than 50 nanometers. Otherwise, the crystallization of the heat storage material 12 often fails.

As is clear from Table 1, from the viewpoint of the inevitable crystallization of the heat storage material 12, it is desirable that the inorganic porous material is silica gel or activated carbon.

As demonstrated in the above examples, by adding the inorganic porous material having the average pore diameter of not more than 50 nanometers to the heat storage material 12, even after the heat storage material 12 is held at the high temperature of not less than the melting point thereof (i.e., not less than 58 degrees Celsius) and not more than 80 degrees Celsius, the latent heat is allowed to be taken out by voltage application.

INDUSTRIAL APPLICABILITY

In the heat storage device according to the present invention, even after the heat storage material 12 is held at a high temperature in the liquid state, the latent heat can be taken out by voltage application.

As an example, the heat storage device according to the present invention is mounted in a vehicle comprising an engine configured to drive wheels. The heat released from the heat storage material 12 is used to warm up an internal combustion engine such as an engine provided in a vehicle. The heat storage device according to the present invention is also mounted in a boiler, an air conditioner, or a water heater.

REFERENTIAL SIGNS LIST

10 Heat storage device
11 Heat storage tank
12 Heat storage material
13 Electrode
14 Direct-current power supply
15 Switch
20 Surface of activated carbon
21 Macropore
22 Micro mesopore

The invention claimed is:
1. A method for releasing heat, the method comprising:
(pa1) crystallizing a heat storage material containing sodium acetate trihydrate;
(pa2) melting the heat storage material at a temperature of not more than 80 degrees Celsius after the step (pa1);
(a) cooling the heat storage device comprising the heat storage material to bring the sodium acetate trihydrate into a supercooled state;
wherein
the heat storage device comprises:
    a first electrode having a surface which is in contact with the heat storage material, wherein the surface is formed of at least one selected from the group consisting of silver, a silver alloy, and a silver compound;
    a second electrode in contact with the heat storage material;
    an inorganic porous material contained in the heat storage material; and
    a power supply for applying a voltage to the first electrode and the second electrode; and
the inorganic porous material has an average pore diameter of not less than 10 nanometers and not more than 50 nanometers; and
the inorganic porous material is formed of silica gel;
(b) applying a voltage to the first electrode and the second electrode with the power supply at a temperature of not more than 58 degrees Celsius after the step (a) to release the heat from the heat storage material; and
(c) heating the heat storage device at a temperature of not less than 58 degrees Celsius and not more than 80 degrees Celsius to melt the sodium acetate trihydrate after the step (b).
2. The method according to claim 1, wherein
the step (pa1) comprises:
(pa11) cooling the heat storage material to a temperature of not more than minus 30 degrees Celsius.
3. The method according to claim 1, wherein
the step (pa1) comprises:
(pa12) adding a crystal of sodium acetate trihydrate to the heat storage material in the supercooled state.
4. A method for applying heat to an engine included in a vehicle, the method comprising:
(pa1) crystallizing a heat storage material containing sodium acetate trihydrate;
(pa2) melting the heat storage material at a temperature of not more than 80 degrees Celsius after the step (pa1);
(a) cooling the heat storage device comprising the heat storage material to bring the sodium acetate trihydrate into a supercooled state;
wherein
the heat storage device is included in the vehicle;
the heat storage device comprises:
    a first electrode having a surface which is in contact with the heat storage material; the surface being formed of at least one selected from the group consisting of silver, a silver alloy, and a silver compound;
    a second electrode in contact with the heat storage material;
    an inorganic porous material contained in the heat storage material; and
    a power supply for applying a voltage to the first electrode and the second electrode; and the inorganic porous material has an average pore diameter of not less than 10 nanometers and not more than 50 nanometers; and the inorganic porous material is formed of silica gel;

(b) applying a voltage to the first electrode and the second electrode with the power supply at a temperature of not more than 58 degrees Celsius to apply the heat to the engine due to release of the heat from the heat storage material;

(c) heating the heat storage device at a temperature of not less than 58 degrees Celsius and not more than 80 degrees Celsius to melt the sodium acetate trihydrate after the step (b).

5. The method according to claim 4, wherein the step (pa1) comprises:

(pa11) cooling the heat storage material to a temperature of not more than minus 30 degrees Celsius.

6. The method according to claim 4, wherein the step (pa1) comprises:

(pa12) adding a crystal of sodium acetate trihydrate to the heat storage material in the supercooled state.

* * * * *